US007861966B2

(12) United States Patent
Rethorst (10) Patent No.: US 7,861,966 B2
(45) Date of Patent: Jan. 4, 2011

(54) SUPERSONIC AIRCRAFT FOOTPRINT SPREADING CONTROL SYSTEM AND METHOD

(75) Inventor: Scott Rethorst, Souh Pasadena, CA (US)

(73) Assignee: Vehicle Research Corporation, Northridge, CA (US)

( * ) Notice: Subject to any disclaimer, the term of this patent is extended or adjusted under 35 U.S.C. 154(b) by 111 days.

(21) Appl. No.: 11/403,253

(22) Filed: Apr. 12, 2006

(65) Prior Publication Data

US 2009/0206207 A1 Aug. 20, 2009

Related U.S. Application Data

(60) Provisional application No. 60/672,465, filed on Apr. 18, 2005, provisional application No. 60/673,747, filed on Apr. 21, 2005.

(51) Int. Cl.
*B64C 23/06* (2006.01)
*B64C 1/40* (2006.01)
(52) U.S. Cl. .................. 244/1 N; 244/198; 244/204.1
(58) Field of Classification Search ............... 244/1 N, 244/15, 130, 204, 207, 35 A, 198, 201, 203, 244/204.1
See application file for complete search history.

(56) References Cited

U.S. PATENT DOCUMENTS

| 2,479,487 | A | * | 8/1949 | Goembel | ................ 244/15 |
| 2,644,266 | A | | 7/1953 | Updegrove | |
| 2,649,266 | A | | 8/1953 | Darrieus | |
| 2,657,575 | A | * | 11/1953 | Allen | ................ 73/147 |
| 2,734,698 | A | * | 2/1956 | Straayer | ................ 244/15 |
| 2,836,379 | A | | 5/1958 | Salmon | |
| 2,891,740 | A | * | 6/1959 | Campbell | ................ 244/15 |
| 2,916,230 | A | | 12/1959 | Nial | |
| 2,950,879 | A | | 8/1960 | Smith | |
| RE24,917 | E | | 12/1960 | Attinello | |
| 2,967,034 | A | | 1/1961 | Eyre | |
| 2,995,320 | A | | 8/1961 | Gottschalk | |
| 2,997,256 | A | | 8/1961 | Walker | |
| 3,051,413 | A | | 8/1962 | Pouit | |
| 3,055,614 | A | | 9/1962 | Thompson | |
| 3,065,932 | A | | 11/1962 | Herrmann | |
| 3,211,401 | A | | 10/1965 | Denning et al. | |
| 3,314,629 | A | | 4/1967 | Rethorst | |
| 3,327,970 | A | | 6/1967 | Sanger | |
| 3,363,861 | A | | 1/1968 | Lambrecht | |
| 3,391,884 | A | | 7/1968 | Carhartt | |

(Continued)

FOREIGN PATENT DOCUMENTS

GB 761077 11/1956

OTHER PUBLICATIONS

Dellar, P., Howell, P. D., Shock-free Supersonic Transport, 2001, European Study Group with Industry, 40th ESGI Keele Sep. 4, 2001-Dec. 4, 2001.*

*Primary Examiner*—Joshua J Michener
(74) *Attorney, Agent, or Firm*—Charles S. Haughey Attorney in Fact (57) ABSTRACT

A method and system to optimize the process a spreading the weight of supersonic aircraft downstream over a large area to reduce the pressure and intensity on the ground as function of air flow velocity, temperature, and/or pressure is provided.

11 Claims, 6 Drawing Sheets

MACH 2 FLIGHT MODE

U.S. PATENT DOCUMENTS

| | | | |
|---|---|---|---|
| 3,447,761 A | 6/1969 | Whitener et al. | |
| 3,535,882 A | 10/1970 | Tizio et al. | |
| 3,576,300 A | 4/1971 | Palfreyman | |
| 3,578,264 A | 5/1971 | Kuethe | |
| 3,582,027 A * | 6/1971 | Hackbarth et al. | 248/550 |
| 3,612,446 A | 10/1971 | Lebert | |
| 3,637,042 A | 1/1972 | Raynes | |
| 3,658,279 A * | 4/1972 | Robertson | 244/53 R |
| 3,677,501 A | 7/1972 | Denning | |
| 3,737,119 A * | 6/1973 | Cheng | 244/1 N |
| 3,756,542 A | 9/1973 | Bertin | |
| 3,785,593 A | 1/1974 | Von Ohain et al. | |
| 3,815,848 A | 6/1974 | Alperin | |
| 3,818,700 A | 6/1974 | Kantrowitz et al. | |
| 3,819,135 A * | 6/1974 | Foxworthy et al. | 244/177 |
| 3,904,151 A | 9/1975 | Rethorst | |
| 3,904,191 A | 9/1975 | Maier, Jr. et al. | |
| 3,909,152 A * | 9/1975 | Rannenberg | 415/27 |
| 4,008,866 A | 2/1977 | Rethorst | |
| 4,168,044 A | 9/1979 | Rethorst | |
| 4,483,497 A | 11/1984 | Rethorst | |
| 4,489,905 A | 12/1984 | Bengelink et al. | |
| 4,559,822 A * | 12/1985 | Huntington | 73/178 R |
| 4,589,886 A | 5/1986 | Gogniat et al. | |
| 4,598,886 A | 7/1986 | Friebel et al. | |
| 4,627,586 A * | 12/1986 | Krumins et al. | 244/3.21 |
| 4,718,620 A | 1/1988 | Braden et al. | |
| 4,736,913 A * | 4/1988 | Bennett et al. | 244/130 |
| 4,932,612 A | 6/1990 | Blackwelder et al. | |
| 5,251,846 A | 10/1993 | Rethorst | |
| 5,358,156 A | 10/1994 | Rethorst | |
| 5,676,333 A | 10/1997 | Rethorst | |
| 5,740,984 A * | 4/1998 | Morgenstern | 244/1 N |
| 5,899,416 A * | 5/1999 | Meister et al. | 244/207 |
| 6,024,119 A * | 2/2000 | Kirschner | 137/487.5 |
| 6,206,326 B1 * | 3/2001 | Stanek et al. | 244/137.4 |
| 6,371,414 B1 * | 4/2002 | Truax et al. | 244/201 |
| 6,536,714 B2 * | 3/2003 | Gleine et al. | 244/214 |
| 6,539,290 B1 * | 3/2003 | Vos | 701/3 |
| 6,662,575 B2 * | 12/2003 | Clarke | 62/87 |
| 7,025,088 B2 * | 4/2006 | Saunders | 137/552 |
| 7,070,146 B2 * | 7/2006 | Morgenstern et al. | 244/35 A |

* cited by examiner

FIG.1

CROCC'S EQUATION

EQUATION SHOWS RELATIONSHIP BETWEEN---
ENTROPY (SHOCKS) / CIRCULATION (VORTICITY) / ENTHALPY (ENERGY VARIATION)

$$T \, \text{grad} \, s + q \times \text{curl} \, q = \text{grad}\left(h + \frac{q^2}{2}\right)$$

FIG.5A
TRANSONIC FLIGHT MODE

FIG.5B
MACH 2 FLIGHT MODE

SUPERSONIC AIRCRAFT FOOTPRINT SPREADING CONTROL SYSTEM AND METHOD

CROSS-REFERENCE TO RELATED APPLICATIONS

This application is based upon and claims priority on U.S. Provisional Application No. 60/673,747, filed on Apr. 21, 2005 and U.S. Provisional Application No. 60/672,465, filed on Apr. 18, 2005, the contents of both of which are incorporated herein by reference.

BACKGROUND OF THE INVENTION

Currently known shock reducing systems which reduce the generation of shock waves and thereby the sonic boom during supersonic flight are designed for optimum performance at a given flight speed. However, as the flight speed varies, as for example, between transonic flight mode to various other supersonic modes, the effectiveness of the system to reduce shock wave and thus sonic boom is reduced. Consequently, a system that provides for optimized reduction or alleviation of shock waves and thus reduction or alleviation of sonic boom is desired.

SUMMARY OF THE INVENTION

The present invention in an exemplary embodiment optimizes the process of spreading the weight of a supersonic aircraft downstream over a larger area to reduce the pressure intensity on the ground and to reduce the peak pressures of the lead and the aft shock waves. This sonic boom reduction is initiated by sequencing the several elements of wing lift to minimize shock wave strength and thereby reduce supersonic wave drag. This process replaces the forward under wing shock wave by an array of weak compression waves. A portion of the aircraft propulsion compressor air is relocated below the wing as a planar higher mach number jet to generate a vortex array shield to intercept and reflect these weak waves upward to pressurize the aft undersurface of the wing. The higher Mach number underwing jet also provides a higher velocity along this wing undersurface. The underwing flow, energized in this manner, will form a vortex array between the jet stream and the ambient air flow which intercepts the lead shock wave, in the form of compression waves, and reflects them toward the aft undersurface of the wing, causing a reduced residual of the waves to pass through to the ground and make a much reduced pressure rise for an inaudible sonic boom. Such flow will assume a direction approaching that of the horizontal flow above the wing, reducing the strength of the closing shock wave required to align these flows. The resulting closing shock is weaker and shallower because the intersecting streams now intersect at a smaller angle, requiring a weaker shock wave to align them. The resulting shock wave, which is nearly completely dissipated, will spread a ground pressure footprint downstream, substantially reducing the supersonic wave drag and the sonic boom. One or more pressure sensors, located on the aft wing undersurface, and an aircraft velocity sensor control the position, mass flow, velocity, and inclination of the underwing jet of engine compressor air.

In another exemplary embodiment, a system is provided whereby the forward and aft shock waves are modified as a function of velocity, and/or temperature and/or pressure minimizing their strength resulting in the spreading of the aircraft footprint far down stream, thereby reducing the footprint intensity and the sonic boom created, consequently forming a shock-free system. In an exemplary embodiment, the system adjusts an under-wing planar jet flow as a function of ambient air flow velocity, and/or temperature and/or pressure so as to minimize the sonic boom created during supersonic flight.

In yet another exemplary embodiment a system is provided for reducing the sonic boom generated by an aircraft when flying at supersonic speeds. The system includes a jet for providing a jet flow below a wing of the supersonic aircraft, a mass control valve coupled to the jet for controlling the mass flow rate through the jet, and a velocity control valve for controlling the velocity of the jet flow. In another exemplary embodiment, the system further includes a nozzle rotatably coupled to an outlet of the jet for selectively directing the jet flow. In yet a further exemplary embodiment, the system also includes one or more sensors coupled to an undersurface of the wing for sensing velocity and/or pressure of a flow across the undersurface. In yet another exemplary embodiment, the system may further include an aircraft velocity sensor for sensing the aircraft velocity, such that the velocity control valve controls the velocity of the jet flow in response to the aircraft velocity sensed by the aircraft velocity sensor. In another exemplary embodiment, the nozzle is rotated in response to measurements made by the sensors. In yet a further exemplary embodiment, the system may include a processor for receiving data from said sensors relating to the velocity, pressure and aircraft velocity and providing an input for controlling said mass control and said jet velocity control valves and for rotating the nozzle.

In another exemplary a method for reducing sonic boom generated when an aircraft increases its velocity to supersonic velocity is provided. The method includes providing a jet flow below a wing of the supersonic aircraft, controlling the mass flow rate of said jet flow in response to a velocity and pressure of a free stream airflow across an undersurface of the wing, and controlling the velocity of the jet flow in response to the aircraft velocity. In another exemplary embodiment, the method further includes varying the direction of the jet flow in response to aircraft velocity. In an exemplary embodiment, the jet flow generates vortices in the free stream airflow across the wing. In another exemplary embodiment, the vortices mix and grow. In yet another exemplary embodiment, the velocity of the jet flow minus the velocity of the free stream airflow is not greater than Mach 2.

In one exemplary embodiment, controlling the mass flow rate and controlling the velocity of the jet flow includes varying the mass flow rate in response to variations in free stream airflow and pressure and varying the velocity of the jet flow in response to the velocity of the wing for maintaining the difference in between the velocity of the jet flow and the velocity of the free stream airflow to a level not greater than Mach 2. In another exemplary embodiment the direction of the jet flow is varied to reflect compression waves generated by the aircraft wing upward in a diverging array for pressurizing an aft undersurface of the wing. In an exemplary embodiment, the direction of the jet flow is downward relative to the direction of travel of the wing when at transonic speeds. In another exemplary embodiment, the direction of the jet flow is generally parallel to the direction of travel of the wing when the wing is traveling at Mach 2.

In yet a further exemplary embodiment, a method for reducing a sonic boom generated when an aircraft flies from transonic to supersonic speeds is provided. The method includes generating a jet flow below a wing for energizing a free stream flow across an undersurface of the wing, and controlling the mass flow rate of the jet flow, the velocity of the jet flow and the direction of the jet flow to reflect compression waves generated by the aircraft wing upward in a diverging array for pressurizing an aft undersurface of said wing while at transonic speeds and while at supersonic speeds. In another exemplary embodiment, the mass flow rate is varied in response to variations in free stream airflow and pressure and the jet flow velocity is varied in response to a velocity of the wing for maintaining the difference between the velocity of the jet flow and the velocity of the free stream airflow to a level not greater than Mach 2.

In yet another exemplary embodiment, a method for reducing a sonic boom generated when an aircraft having a wing flies from transonic to supersonic speeds is provided. The method includes generating an aft wing shock wave, generating an aircraft pressure footprint, weakening the aft shock wave and extending the footprint at least 10 miles downstream from the wing. In a further exemplary embodiment, the method includes extending the shock wave at least 10 miles downstream from the wing upon generation of the shock wave. In another exemplary embodiment, extending the footprint includes aligning an air flow across an under surface of the wing with an airflow across an upper surface of the wing. In yet a further exemplary embodiment, extending the footprint includes modifying the aft shock wave and a forward shock wave.

DETAILED DESCRIPTION OF THE PREFERRED EMBODIMENT

In the following paragraphs like numbers refer to the same or similar items from figure to figure.

Figure 3A:
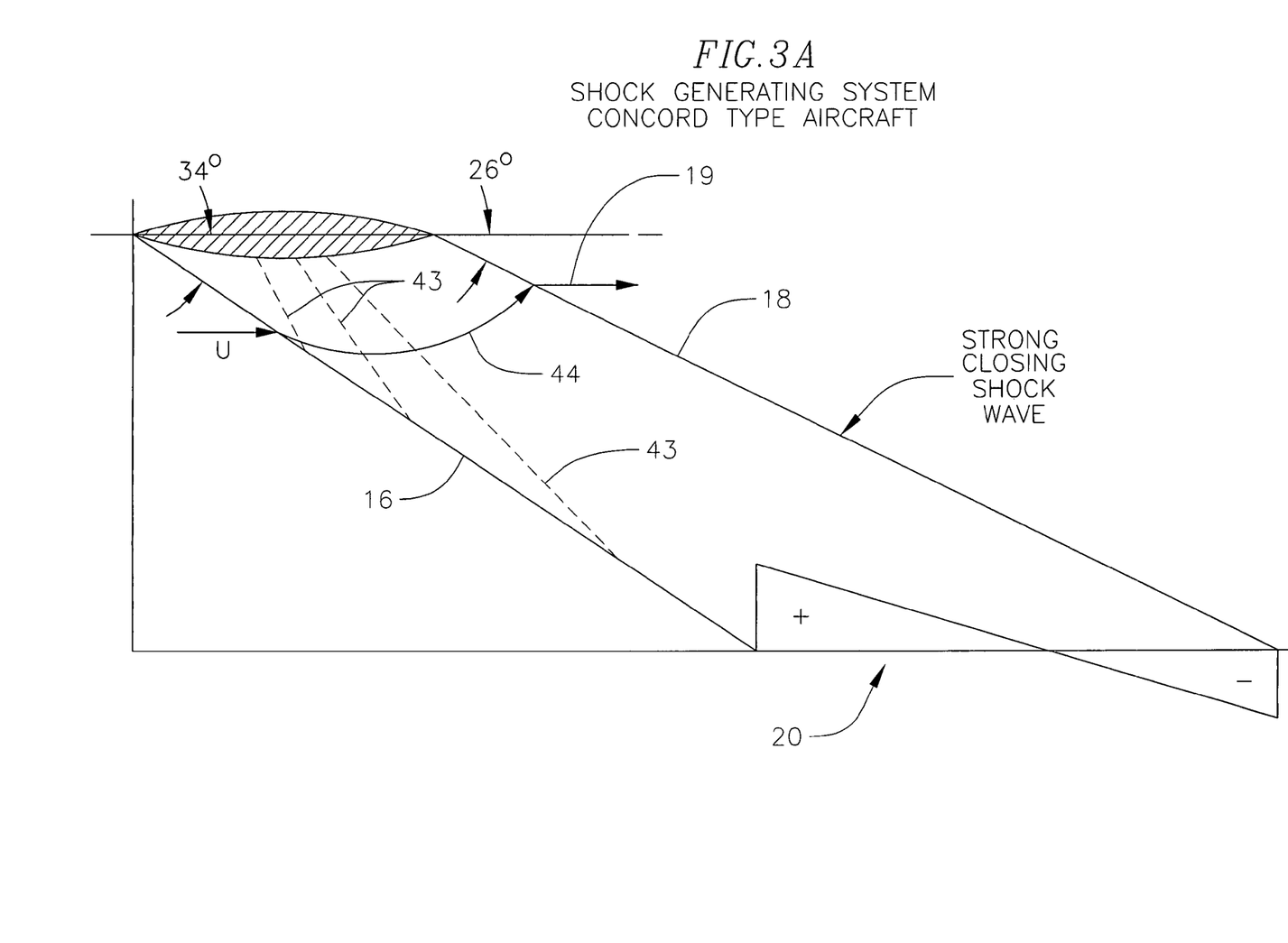
FIG. 3A is a schematic view of supersonic flow of a typical supersonic aircraft such as the Concorde.

The weight of an airplane in flight appears on the ground as a force which may be expressed as the product of a footprint pressure times the area over which it acts. For a subsonic aircraft this footprint area is very large, in the form of a circular mound, with a pressure so weak that it cannot be felt on the ground and a pressure rise so small that no audible sonic boom is heard. For a conventional supersonic aircraft, in contrast, the pressure footprint area is very small, in the form of an "N" wave 20, and the corresponding pressure rise is rapid and strong, producing a very annoying sonic boom (FIG. 3A).

The footprint is small because shock waves bound the footprint area and these waves both closely approach the same Mach line from opposing sides. Applicant has discovered that a larger footprint would have a corresponding initial and closing pressure rise and sonic boom.

Figure 1:
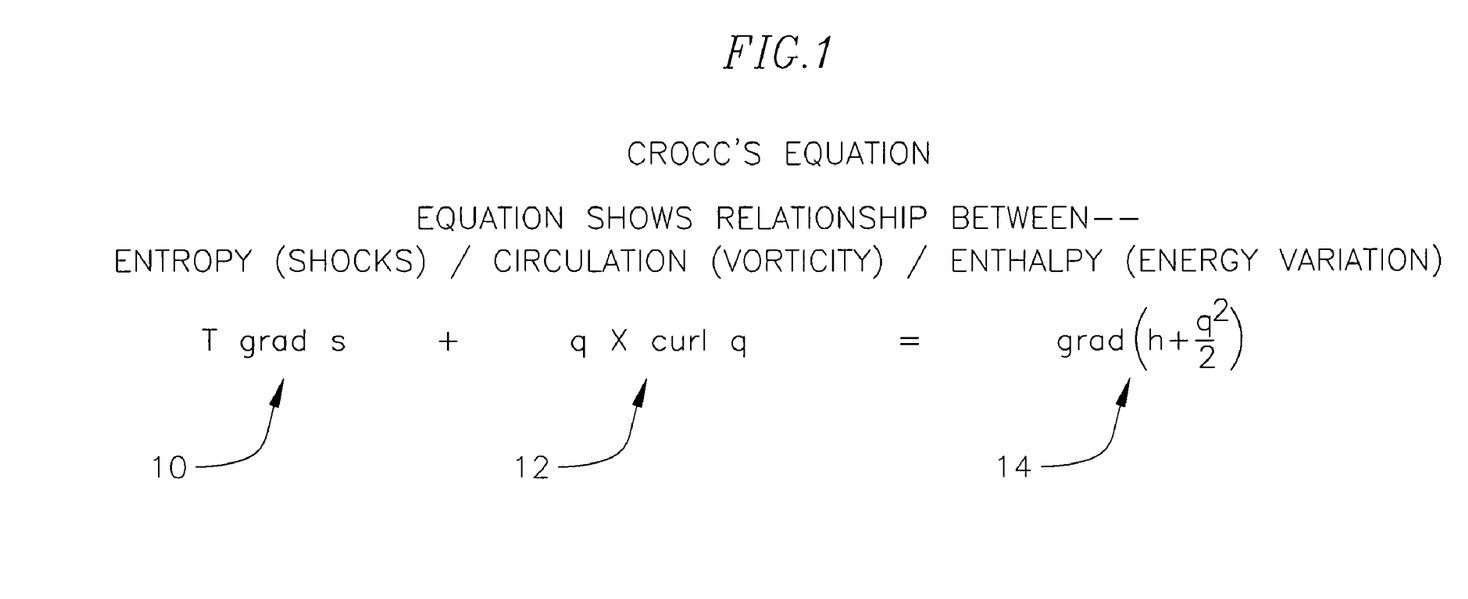
FIG. 1 depicts Crocco's Equation

Crocco's Equation as shown in FIG. 1, illustrates that there are two, and only two, ways to fly supersonic. Crocco's Equation is derived from the fundamental laws of physics and shows the balance of circulation about a wing in supersonic flight. The equation has three terms 10, 12, and 14.

The first way to fly supersonic, as defined by Crocco's Equation, is in a uniform energy flow field, expressed by a zero magnitude third term 14, where shock waves of the first term 10 generate the required wing air flow circulation. Shock waves in this case not only determine the footprint but lead to shock wave energy dissipation and a corresponding sonic boom. Further, these shock waves spread the footprint within the bounds of the lead and closing shock waves In a conventional supersonic airplane, such as the Concorde, a ground pressure is generated which is bounded by two shock waves, a forward or lead shock wave 16 and an aft shock wave 18, as for example shown in FIG. 3A. The region between these two shock waves is an expansion which together with the shock waves form an N wave 20 on the ground. The forward or leading edge shock wave 16 retards the underwing air flow, generating an expansion field of wing flow circulation 43 and causes the aft underwing flow 44 to incline downward and then upwards (FIG. 3A). The aft shock wave 18 turns the upwards inclined underwing flow to a horizontal flow 19, and continues downward at a steep angle expending considerable strength and generating drag losses, limiting the ground pressure to a fairly strong, short N wave 20.

Figure 2:
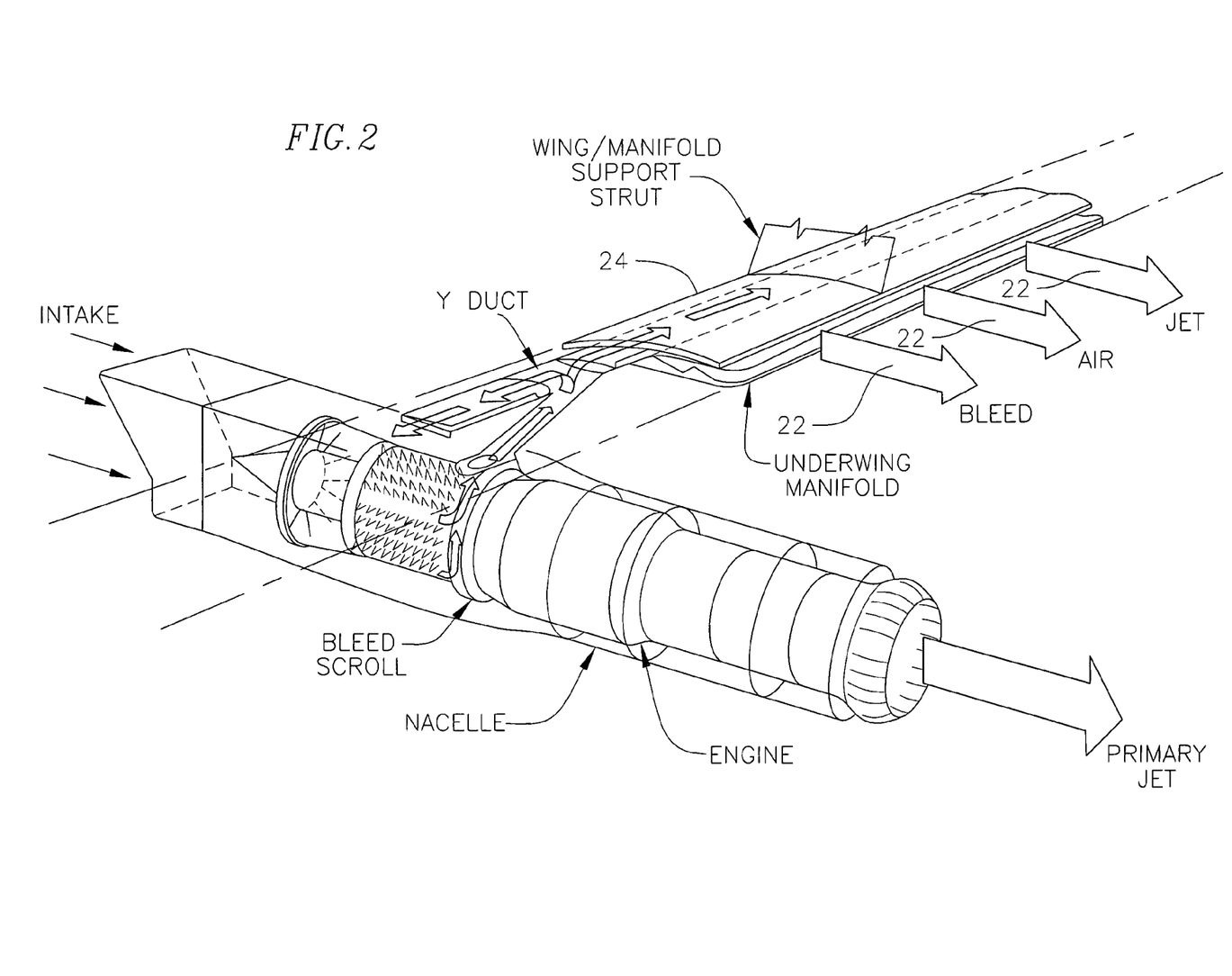
FIG. 2 is a perspective view of a generally shock-free supersonic propulsion system.
Figure 3B:
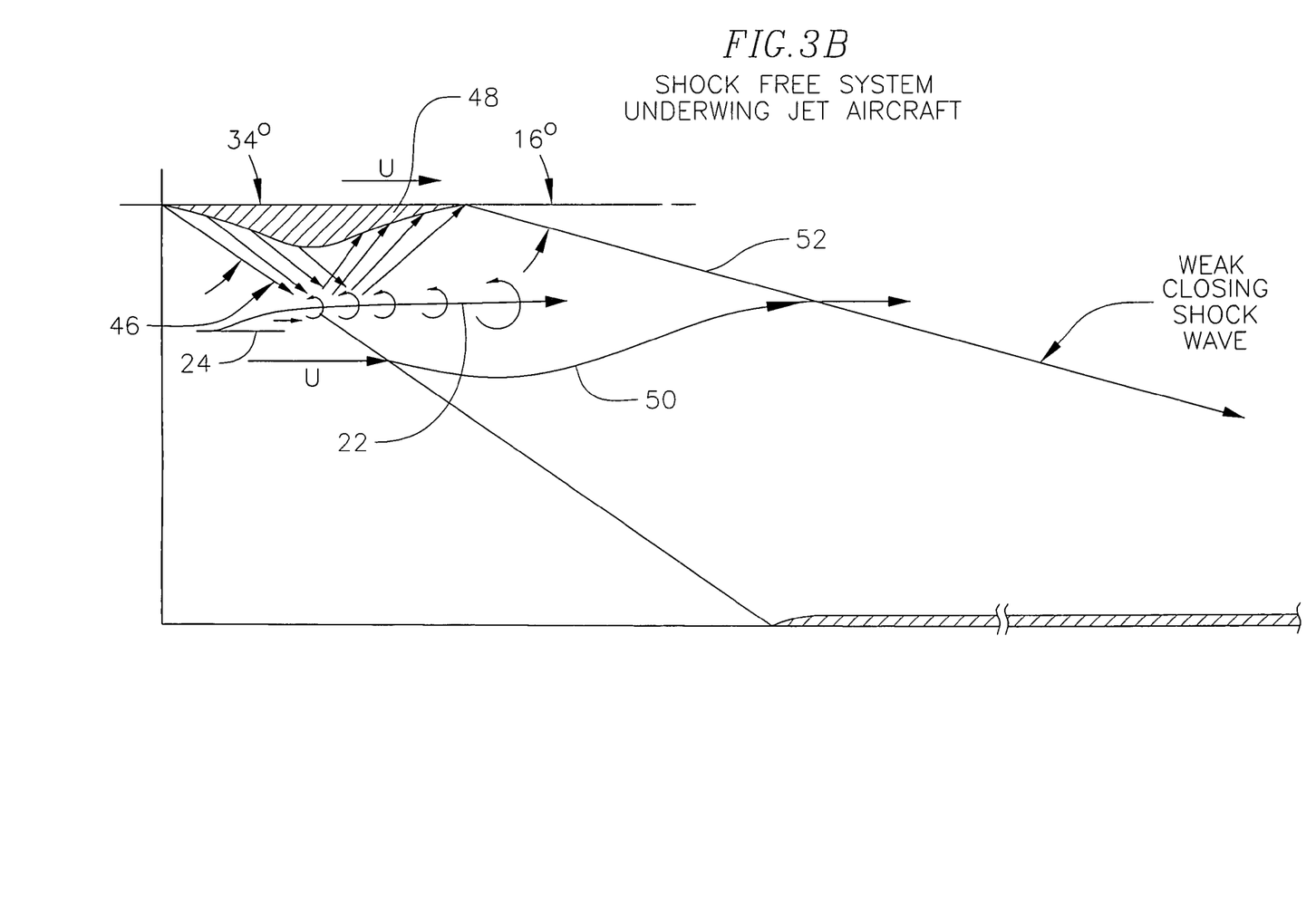
FIG. 3B is a schematic view of supersonic flow of a system incorporating an underwing planar jet

The second way to fly supersonic, again as defined by Crocco's Equation, is to fly in a non-uniform energy flow field. To do this, a portion of the propulsive jet, preferably the unburned compressor air is relocated, to provide an underwing planar jet flow 22 as shown in FIGS. 2 and 3B, adding energy as required by Crocco's third term 14. This can be accomplished using a planar jet 24 or as shown in FIGS. 2 and 3B. The planar jet 24 has a supersonic converging/diverging nozzle for generating a supersonic flow. The leading edge shock is replaced by a compression wave array 46 which is reflected upwards by the higher Mach number underwing jet to pressurize the aft wing undersurface 48, forcing the underwing flow to approach the horizontal inclination of the stream above the wing. With the two flows nearly aligned, only a weak closing shock wave 52 at a shallow angle is required. This wave intercepts the ground far downstream, spreading the footprint accordingly. This method of flying supersonic has been described in U.S. Pat. No. 5,676,333, issued Oct. 14, 1997, the contents of which are incorporated herein by reference. However, this method of flying supersonic does not account for variations in velocity, pressure and temperature of the air flow changes.

The two supersonic systems are illustrated side-by-side in FIGS. 3A and 3B. These figures summarize the two supersonic mechanisms, showing that pressures on the aft wing undersurface control the strength and inclination of the aft closing shock wave and the downstream footprint extension.

Figure 4:
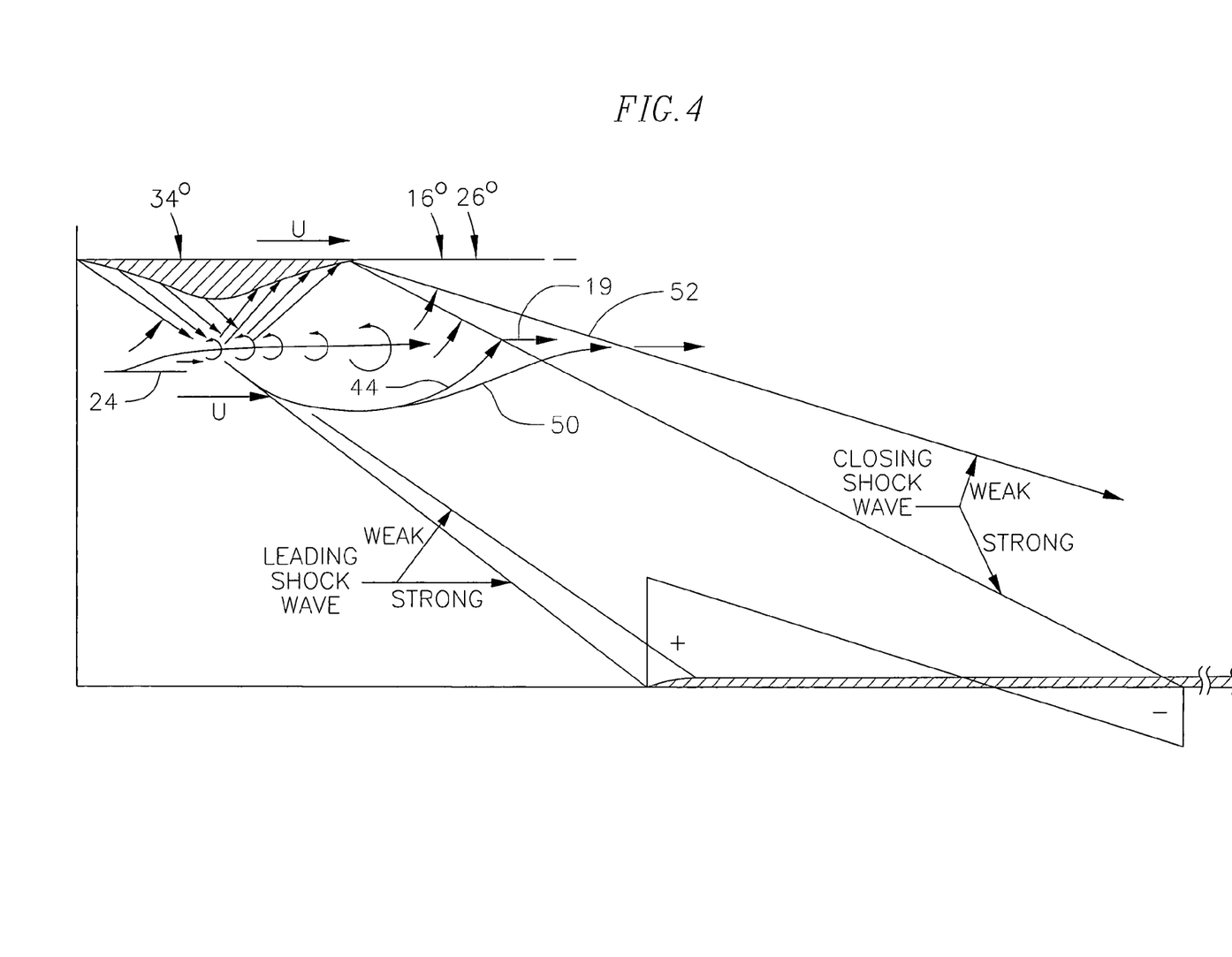
FIG. 4 depicts an overlay of the two systems shown in FIGS. 3A and 3B

FIG. 4 is an overlay of the two systems. The shock generating system is shown with its usual N wave pressure profile on the ground. The shock free system is shown with its leading edge compression wave array reflected upwards by the underwing jet to pressurize the aft wing undersurface. This forces the underwing flow down to a somewhat horizontal path approaching the alignment of the flow above the wing, requiring only a weak and shallow closing shock with minimum wave drag, intercepting the ground far downstream, providing only a weak sonic boom.

Figure 5A:
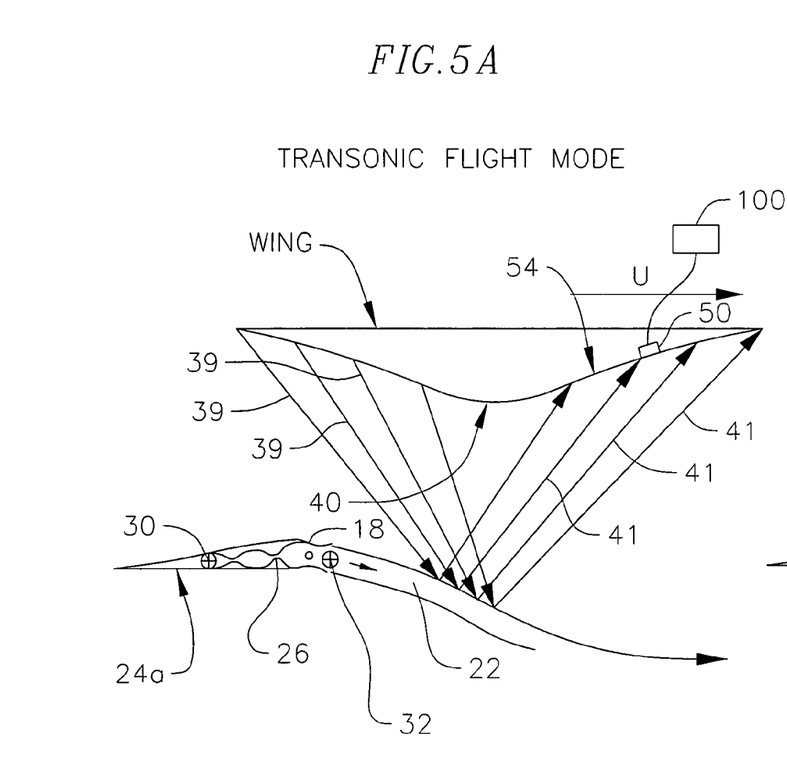
FIG. 5A is a schematic view of an exemplary embodiment control system in transonic flight mode
Figure 5B:
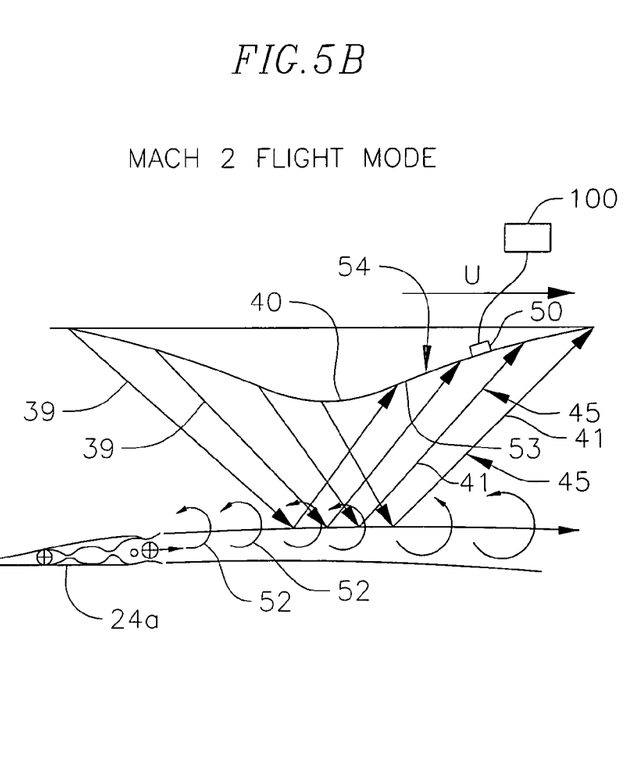
FIG. 5B is a schematic view of an exemplary embodiment control system in Mach 2 flight mode.

The present invention in an exemplary embodiment as shown in FIGS. 5A and 5B modifies the forward and aft shock waves, as a function of flow velocity, temperature and/or pressure minimizing the forward and aft shock wave strength by reflection of the forward shock wave and realigning the orientation of the aft shock wave to approximate the direction of flow above the wing. These steps intercept the initial shock wave, reducing the residual wave which reaches the ground, and spread the aft aircraft footprint far downstream to reduce its intensity and the sonic boom, thereby forming a shock-free system.

As shown in FIG. 5A, the forward wing undersurface 37 is curved down like a supersonic nozzle to split the forward shock wave into a large number of isoentropic compression waves 39, which still provide circulation but with less drag. The wing under surface 40 is a cosine surface as shown in FIGS. 5A and 5B and also disclosed in U.S. Pat. No. 5,676,333. The underwing jet 22 intercepts and reflects a substantial portion of these weak compression waves 39 upward greatly reducing the residual leading waves reaching the ground, and forming aft reflections 41 to the aft undersurface of the wing, increasing the underwing pressure and stream velocity. The aft closing shock wave may now be quite weak and shallow because the underwing flow is now nearly aligned with the upper surface flow due to its pressurization by the aft reflections 41, spreading the footprint pressure far downstream to minimize the ground pressure intensity and sonic boom. By this reflection process, the aircraft footprint opens up and the footprint and the aft shock wave extend to at least 10 miles downstream from the wing thereby reducing or alleviating the supersonic boom.

To accomplish this, a supersonic nozzle or jet is used. While its internal design is not critical to this invention, an exemplary embodiment planar jet 24a is shown in FIGS. 5A and 5B having a first chamber or manifold which receives highly compressed and heated air from the aircraft engine compressor (or a suitable alternate source), an opening toward the rear in the flight path which controls the flow direction, by using vanes (not shown), a chamber to balance pressure transverse of the wing, and a converging/diverging nozzle to release the air at supersonic velocity. Although it is possible to burn fuel in the intermediate chamber, it is not necessary when the compressor delivers several atmospheres of pressure to the manifold. An exit nozzle 28 is hingeably coupled to the exit of the jet. The nozzle can rotate between upward and downward positions relative to the planar jet flow. A jet mass flow control valve 30 controls the mass flow through the planar jet. A jet velocity control valve, controls the velocity of the jet exiting the planar jet. In an exemplary embodiment shown in FIG. 5A, the jet mass flow control valve 30 is positioned within the planar jet, while the jet velocity control valve 32 is positioned on the exit on the exit nozzle 28. One or more sensors 50 are located on the aft wing undersurface to sense the pressure, temperature and velocity of the flow.

FIGS. 5A and 5B illustrate the change in inclination of the wing compression waves with a change in aircraft speed for an exemplary embodiment system. These figures also illustrate the controls for the shock free system, comprising one or more sensors located on the aft wing undersurface to sense the pressure and velocity of the flow. This information is fed to a computer processor 100 to operate the jet mass control valve 30 controlling the mass flow of the underwing jet providing substantial reductions in supersonic wave drag and essential elimination of the sonic boom. To avoid excessive underwing jet flow velocity, the jet flow generated by the jet is adjusted based aircraft velocity and/or air flow velocity which in an exemplary embodiment is measured by a jet velocity sensor 50. The jet flow velocity is adjusted by the jet flow velocity control valve which controls the jet aperture to maintain the desired planar jet velocity.

FIG. 5A shows the converging steep forward compression waves 39 at transonic Mach numbers. The similarly converging shallow waves 39 at Mach 2 are shown in FIG. 5B together with their diverging array 45 of reflected waves 41 reflected up to pressurize the aft wing undersurface. In each case, the angle of the compression waves and the reflected waves has been exaggerated for ease of illustration, but the actual angles may be more shallow than shown. Sensors 50 provide data to control the mass flow and velocity of this mechanism.

In operation, the jet 24a creates a supersonic flow that generates vortices 52 that mix and grow as shown in FIG. 5B. The compression waves 39 are reflected upward by these vortices to the trailing portion 53 of the wing under surface 40 of the wing 54 forming reflection of reflected waves 41 and generating a weak closing shock wave. When the tip speed of the rotating vortices 52 is subsonic, each aft vortex generated pushes a subsequent forward vortex upward and each forward vortex generated moves a subsequent aft vortex downward whereby vortices rotate about each other, pair-up, mix and grow. When the vortex tip speed is supersonic, applicant has discovered that the aft vortex pushes the forward vortex upward, but the forward vortex cannot push the aft vortex downward. Consequently, vortices do not pair, mix or grow. If the vortices were to fail to grow, then a sufficient system of vortices will not be built up for effectively reflecting the compression waves upward. To maintain the tip speeds of the vortices subsonic, i.e., lower than Mach 1, applicant has discovered that the velocity of the jet flow from the planar jet minus the velocity of the free stream divided by two must be less than Mach 1. Stated differently, the velocity of the jet flow minus the velocity of the free stream must be less than Mach 2. In order to accomplish this, the velocity of the free stream must be monitored and the velocity of the planar jet must be adjusted accordingly. This can be accomplished by controlling the jet mass flow valve 30 and/or the jet velocity control valve 32 on the planar jet.

Applicant has also discovered that the weakness of the closing shock wave can be optimized by optimizing the reflection of the compression waves. As the velocity, pressure and temperature of the air flow changes, the flow of the jet stream must be modified to maintain the differential between that stream and the ambient air flow below Mach 2. As such, by an effort to optimize the velocity of the jet from the planar jet 24, as well as a direction of the jet flow, the mass flow through the jet, the pressure on the trailing lower surface of the wing and atmospheric pressure, will need to be monitored and the jet mass flow valve, the jet velocity control valve, and/or the nozzle need to be adjusted accordingly. This could be accomplished in real time during flight. For example data relating to velocity, pressure, and temperature may be fed from the sensor(s) 50 to the computer or processor 100 along with data from the same or other sensors. The computer or processor then calculates the requisite jet mass flow rate, jet velocity and nozzle incline angle. Based on these calculations signals are send to appropriate mechanisms, as for example servos, for adjusting the jet mass flow valve 30, the jet velocity control valve 32 and the nozzle 28 for achieving the requisite jet mass flow rate, jet velocity and nozzle incline angle.

In an alternate exemplary embodiment, the precise mass flow rate, jet velocity and nozzle orientation can be determined for various conditions and stored on a table on a computer or processor 100 before flight, such that during flight when any of the stored conditions are encountered and sensed by the appropriate sensors, a signal or signals are sent to appropriate mechanisms, as for example servos, for adjusting the jet mass flow valve 30, the jet velocity control valve 32 and the nozzle 28 for achieving the requisite jet mass flow rate, jet velocity and nozzle incline angle. Other data that may be required for determining the appropriate jet mass flow and velocity and the appropriate nozzle angle may include aircraft altitude, wing loading, wing length, wing attach angle, wing aspect ratio, gross weight, wing area and acoustic growth.

For example, as shown in FIG. 5A, at operation at transonic speeds, the jet flow 22 is inclined downwards so it can intercept and reflect the compression waves 39 upwards as a diverging array at an angle such as to pressurize the aft undersurface 53 of the wing. FIG. 5B illustrates the same system operating at Mach 2 cruise speed. For this case the manifold nozzle should be directed aft emitting the underwing jet in a generally horizontal direction so as to appropriately reflect the compression waves 39 to pressurize the aft undersurface 53 of the wing 54.

Although specific exemplary embodiments are disclosed herein, it is expected that persons skilled in the art can and will design or derive alternative window assemblies and/or methods of forming window assemblies that are within the scope of the following claims either literally or under the doctrine of equivalents.

The invention claimed is:

1. A method of reducing sonic boom generated when an aircraft having a wing forward undersurface section curving down to produce weak shock compression waves and an aft undersurface section curved up to receive and re-reflect reflected shock compression waves changes its velocity from one supersonic velocity to another supersonic velocity, the method comprising:

flying said aircraft at a first supersonic velocity generating a free stream airflow having a free stream airflow first velocity across an undersurface of a wing of said aircraft;

providing a nozzle below and transverse the wing;

generating via said nozzle an essentially uniform planar jet flow aft in the general line of flight below and transverse of the wing of said aircraft said jet flow having a jet flow first velocity in excess of the free stream airflow first velocity, wherein vortices are generated between said jet flow and said free stream flow, whereby shock compression waves from a forward undersurface portion of said wing are received and reflected by said vortices to an aft undersurface portion of said wing; changing said aircraft velocity to a second supersonic velocity different from the first supersonic velocity generating a free stream airflow second velocity across the undersurface of said wing different from the free stream airflow first velocity; and adjusting a jet flow velocity to a second jet flow velocity in response to said free stream second velocity, said jet flow second velocity for continuing to maintain said vortices, whereby weak shock compression waves from the forward undersurface portion of the wing continue to reflect from the vortices;

wherein the jet flow first velocity is selected such that the difference between the jet flow first velocity minus of and the free stream airflow first velocity is not greater than Mach 2, and wherein the jet flow second velocity is selected such that the difference between the jet flow second velocity and the free stream airflow second velocity is not greater than Mach 2 for continuing to maintain said vortices; and wherein the jet flow has a first mass flow rate at the jet flow first velocity, comprising adjusting the mass flow rate of the jet flow and adjusting the first jet flow velocity by varying the mass flow rate in response to variations in free stream airflow and pressure and varying the jet flow first velocity in response to changes in the first velocity of the free stream airflow for maintaining the difference between a jet flow velocity and a velocity of the free stream airflow to at a level not greater than Mach 2.

2. The method as recited in claim 1 further comprising varying the direction of said jet flow in response to aircraft velocity.

3. The method recited in claim 1 wherein the jet flow first and second velocities allow said vortices to mix and grow.

4. The method recited in claim 1 wherein the direction of the jet flow is varied to reflect compression waves generated by the aircraft wing upward in a diverging array for pressurizing an aft undersurface of said wing.

5. The method as recited in claim 4 wherein the aircraft speed is changed to transonic and the direction of the jet flow is set downward relative to the direction of travel of the wing when at transonic speeds.

6. The method recited in claim 4 wherein the direction of the jet flow is generally parallel to the direction of travel of the wing when the wing is travelling at Mach 2.

7. The method as recited in claim 2 wherein varying the direction of said jet flow in response to aircraft velocity comprises raising said flow toward said undersurface of said wing as said free stream airflow velocity across said undersurface of said wing increases.

8. The method as recited in claim 1 wherein adjusting the mass flow rate comprises adjusting a mass control valve.

9. The method as recited in claim 1 wherein adjusting the jet flow velocity comprises adjusting a velocity control valve.

10. A method for reducing sonic boom generated when an aircraft changes its velocity from one supersonic velocity to another supersonic velocity, the method comprising:

flying the aircraft at a first supersonic velocity generating a first airflow having a first underwing velocity across an undersurface of a wing of said aircraft;

providing a nozzle below and transverse the wing;

generating via said nozzle a jet flow below the wing of said aircraft, said jet flow having a jet flow first velocity, wherein vortices are generated between said jet flow and said underwing airflow, and said jet flow being positioned to intercept and reflect shock waves from the wing to an aft undersurface portion of the wing; adjusting the jet flow velocity to a jet flow first second velocity in response to changing said first underwing airflow first velocity to a second underwing airflow velocity to maximize said reflection of the shock waves;

wherein the jet flow first velocity is selected such that the difference between the jet flow first velocity and the underwing airflow first velocity is not greater than Mach 2, and wherein the difference between the underwing airflow second velocity and the jet flow second velocity is not greater than Mach 2 for maximizing said reflection of said shock waves; and wherein the jet flow has a first mass flow rate at the underwing first velocity, comprising adjusting the mass flow rate of the jet flow and adjusting the first jet flow velocity by varying the mass flow rate in response to variations in underwing airflow and pressure and varying the jet flow first velocity in response to changes in the first velocity of the underwing airflow for maintaining the difference between a jet flow velocity and a velocity of the underwing airflow to at a level not greater than Mach 2.

11. A method for reducing sonic boom generated when an aircraft changes its velocity from one supersonic velocity to another supersonic velocity, the method comprising:

flying the aircraft at a first supersonic velocity generating a first airflow having a first underwing velocity across an undersurface of a wing of said aircraft;

providing a nozzle under and transverse of the wing;

generating via said nozzle a jet flow below the wing of said aircraft, said jet flow having a jet flow first velocity maintained at a velocity in a velocity range greater than the underwing airflow velocity by up to Mach 2, wherein vortices are generated between said jet flow and said underwing airflow, and said jet flow being positioned to intercept and reflect shock waves from the wing to an aft undersurface portion of the wing;

changing said first underwing airflow first velocity to a second underwing airflow velocity; and adjusting the jet flow velocity to a jet flow second velocity in a velocity range greater than the underwing airflow velocity by up to Mach 2 to maximize said reflection of the shock waves, in response to the change of said first underwing airflow first velocity to a second underwing airflow velocity, and wherein the jet flow first velocity is selected such that the difference between the jet flow first velocity and the underwing airflow first velocity is not greater than Mach 2, and wherein the difference between the underwing airflow second velocity and the jet flow second velocity is not greater than Mach 2.

* * * * *